United States Patent [19]

Secord

[11] Patent Number: 4,507,549
[45] Date of Patent: Mar. 26, 1985

[54] ODOMETER RESET MECHANISM

[75] Inventor: Nelson W. Secord, Brighton, Mich.

[73] Assignee: Chrysler Corporation, Highland Park, Mich.

[21] Appl. No.: 621,775

[22] Filed: Jun. 18, 1984

[51] Int. Cl.[3] .................. G01C 22/00; G06C 15/42
[52] U.S. Cl. .................... 235/96; 235/144 R; 235/144 S; 235/144 SS; 235/144 SM
[58] Field of Search .............. 235/95 R, 96, 144 R, 235/144 S, 144 SS, 144 SM

[56] References Cited
U.S. PATENT DOCUMENTS
4,350,880 9/1982 Quintilian ..................... 235/96

Primary Examiner—Benjamin R. Fuller
Attorney, Agent, or Firm—Edward A. Craig

[57] ABSTRACT

A reset mechanism for an odometer is provided. The reset mechanism operates by means of manually rotatable structure which causes rotation of a reset shaft provided in an odometer. Means are provided for permitting manual rotation of the odometer reset shaft through an angular distance of more than 360° before a stop structure is encountered. Spring means are provided to urge the reset mechanism to a start position after each resetting of an odometer. The reset mechanism requires only about half as much manual rotation as the necessary reset rotation for the convenience and ease of the operator.

3 Claims, 5 Drawing Figures

ODOMETER RESET MECHANISM

BACKGROUND OF THE INVENTION

It is common practice in the manufacture of automobiles and trucks to provide, in the instrument cluster, a combined speedometer/odometer device. The reason for integrating odometers with speedometers is that they each can perform their measuring function based upon the same signal, namely, the speed of rotation of the propeller shaft or axle. The signal is capable of being translated into speed in whatever units desired, as for example, miles per hours or kilometers per hour, and also into distance traveled, the speed of rotation being translatable into miles of kilometers.

Commonly, two odometers are provided. One of the odometers gives a permanent reading of the distance the vehicle has traveled during its lifetime. This is usually measured in an amount up to 100,000 or an equivalent number of kilometers. Under existing governmental regulations, this odometer is not allowed to be reset to a zero position. A second odometer is usually provided to give distance traveled for specific purposes, such as to measure the length of a trip, to permit measuring of gas mileage and the like. It is desirable for this odometer to be resettable to a zero position so that the driver may begin any measurement desired from a zero start position. In this way, he does not have to record the initial mileage of the odometer and substract it from the total after his measurement has been taken. Normally, the total measurable distance of a resettable odometer is a great deal less than that provided for on the permanent odometer reading, as for example 1000 total miles.

It is desired that the resettable odometer be easily manipulated by the driver to the zero position. In the past, such odometers have frequently been provided with a reset knob which requires the driver to watch the setting so that he will stop the resetting procedure when the zero position has been reached. A reset mechanism which automatically sets the odometer at the zero position without the driver making observations is desired. Additionally, it is required that such a reset mechanism be quickly operable so as not to divert the attention of the driver for any considerable period of time.

One problem in providing such a reset mechanism for odometers which are commonly used in the automotive industry is that the standard resettable odometer requires turning of the odometer reset shaft an angular distance greater than 360°. If the reset mechanism operates on the principal of a rotatable device, there is an inherent difficulty in causing the reset rotation movement to be set at an angular distance of greater than 360° because some kind of a stop mechanism has got to be provided within the circle of rotation. Since this circle has a maximum angularity of 360°, any single stop mechanism provided cannot exceed this angularity. The desired angularity is provided for in the present invention by the provision of two members, the first of which does not contact the second until a certain angular distance has been traveled, thereby permitting greater than 360° rotation for the reset purposes.

SUMMARY OF THE INVENTION

An odometer reset mechanism is provided to turn an odometer reset shaft through an angular distance greater than 360°. The reset mechanism includes a manually turnable drive shaft which is drivingly connected to an odometer reset shaft. A ring is fixedly mounted on the odometer reset shaft to turn with the shaft. A second ring is mounted on the odometer reset shaft adjacent to the first ring. The second ring is freely rotatable on the odometer reset shaft. A stop arm extends radially outwardly from the second ring. A tooth extends axially outwardly from the first ring into the plane generated by the stop arm upon rotation of the second ring. In this manner, the tooth will engage the stop arm upon rotation of the first ring. A member having a stop surface is positioned in abutting relationship to the stop arm. The stop arm abuts the stop surface upon rotation of the second ring through an arc of less than 360° in either the clockwise or counterclockwise direction. One of the abutting positions of the stop arm defines a start position and the other of the abutting positions of the stop arm defines a reset position. The tooth is rotatable in either the clockwise or counterclockwise direction through an arc of 360° less an angle defined by the width of the stop arm before contacting the stop arm. As a consequence of this structure, when the drive shaft is rotated, the odometer reset shaft may be rotated a distance equal to the arc of rotation of the tooth prior to its contacting the stop arm plus the arc of rotation of the stop arm prior to its contacting the stop surface. The sum of these two arcs is greater than 360°.

DETAILED DESCRIPTION

Speedometers/odometer devices 10 are normally provided in the instrument panel of land vehicles to measure the speed at which the vehicle is traveling and the distance which it has traveled. Conventionally, a permanent magnet is provided in speedometers to actuate a dial pointer 12 which rotates to a point indicating the vehicle speed. This speed is usually indicated by means of indicia indicating either miles per hour or kilometers per hour which is provided on the dial face of the speedometer. This is visually readable by the driver. The permanent magnet is mounted on a shaft which is drivingly connected to the vehicle propeller shaft or axle. Rotation of the propeller shaft or axle causes rotation of the permanent magnet. This results in a rotating magnetic field. The magnet is usually located concentrically within an aluminum ring. The rotating magnetic field induces eddy currents in the ring which in turn produce a magnetic field of their own. The interaction of this magnetic field with that of the rotating permanent magnet exercises a torque on the aluminum ring. This torque tends to rotate the aluminum ring along with the magnet. The faster the magnet rotates, the highwer is the torque. The ring is mounted so as not to be freely rotatable. It is constrained to rotate only a certain distance depending on the magnitude of the applied torque. The spiral spring is usually provided to restrain rotation of the aluminum ring. The pointer is attached to the aluminum ring to indicate the speed of the vehicle.

In modern vehicles, odometers are integrated into speedometers. An odometer is generally defined as a device to record distance traveled, either in miles or in kilometers. Normally, odometers are driven through a small worm gear which is mounted on the speedometer shaft, this being the same shaft that drives the rotating magnet. The motion of the speedometer shaft is greatly reduced by suitable gearing and is transmitted to a drum construction usually comprising several individual drums each of which is provided with peripheral numbers from zero to nine to permit recording distances, usually in the tens of thousands or hundreds. When the first drum which counts the lowest units traveled has turned one whole revolution, the drum for the next units traveled (miles of from 1 to 10, for example) is rotated one place, usually by means of a small driving clutch. When this drum has turned one revolution, it similarly causes rotation of the next drum one place. This operation is repeated for all of the drums up to the maximum amount countable by the odometer.

Neither the speedometer construction nor the odometer construction above described form a part of the present invention. Such constructions are common in the art. Any of various suitable constructions may be used in connection with the present invention which relates to a mechanism for resetting of odometers.

Figure 1:
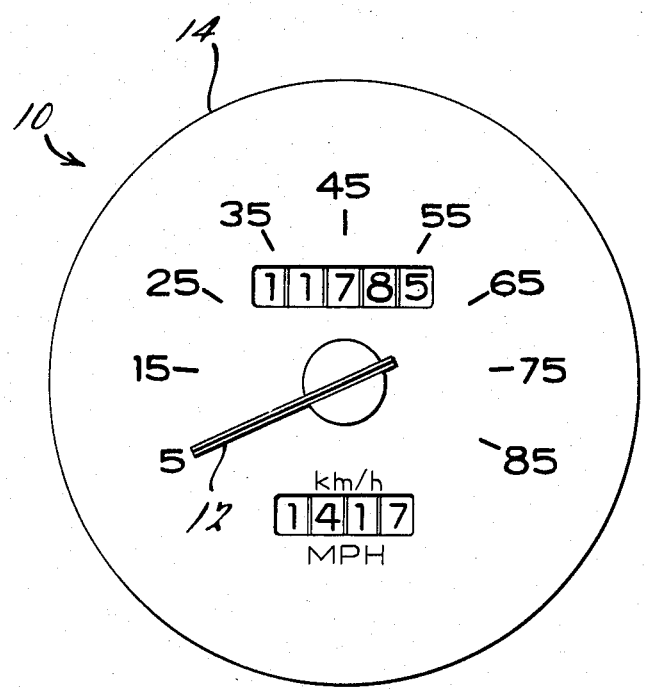
FIG. 1 is a view of the front face of a speedometer/odometer device which includes the odometer reset mechanism of the present invention.

Referring to FIG. 1, it will be noted that two odometers 14, 16 are shown. The odometer 14 has five drums and is capable of recording distance of vehicle travel up to 100,000 miles. Thisn is a permanent record of vehicle travel and the odometer 14 cannot be reset.

The second odometer 16 is resettable. The second odometer 16 is provided for checking miles traveled on for example a trip, or the distance traveled between two specific points to check gas mileage, or like uses which the driver may wish to use such an odometer for. The odometer 16 has four drums, 18, 20, 22, 24. The drum 24 measures miles in tenths, the drum 22 measures miles from 1 to 10, the drum 20 measures miles in tens and the drum 18 measures miles in hundreds. The odometer 16 is capable of measuring up to 1000 miles traveled.

Figure 2:
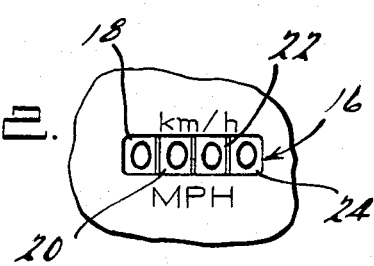
FIG. 2 illustrates the odometer readout after it has been reset to the zero position.

It is desired to permit resetting of the odometer 16. Frequently, the driver will prefer to start from the zero position so that he need not remember the number of miles on the odometer 16 at the beginning of a distance measurement. Illustratively, in FIG. 1, the odometer 16 registers the number of miles which have been previously traveled. As shown in FIG. 2, the odometer 16 has been reset to the zero position wherein each of the drums 18, 20, 22, 24 registers zero.

Figure 3:
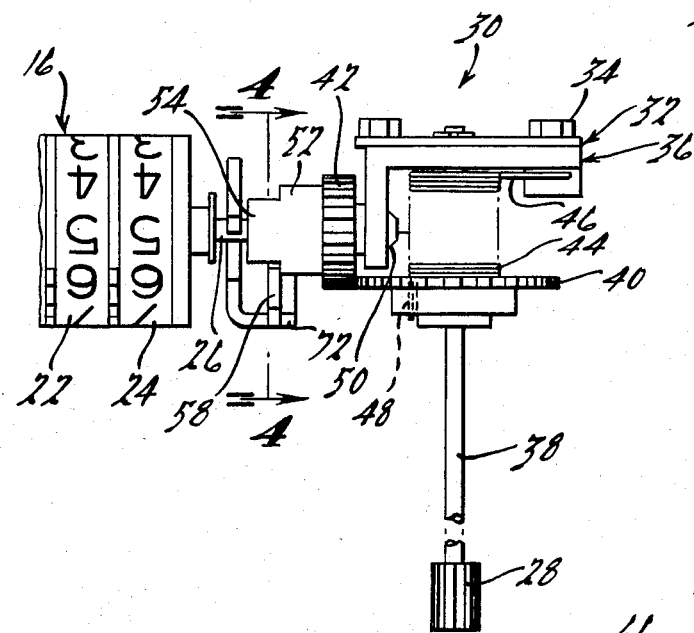
FIG. 3 is a plan view of the odometer reset mechanism of the present invention.

Referring to FIG. 3, it will be noted that an odometer reset shaft 26 extends outwardly from the drum construction. The shaft 26 is connected to the drums through a catch arrangement, which is well known in the art, which permits resetting of the odometer 16 to the zero position illustrated in FIG. 2 upon rotation thereof. In the past, manual reset has required the driver to watch the odometer setting and to stop the resetting process when all of the drums register zero. This is considered undesirable from the standpoint of distracting the drivers attention should he be operating the vehicle and also from the standpoint of being a nuisance. The present odometer reset mechanism permits simple turning of the knob 28 to a stop position whereupon the odometer setting is at zero without the need for the driver to watch the odometer setting.

The odometer reset mechanism 30 is fixedly mounted on a support bracket 32 by means of screws 34. The screws 34 are threadingly received in one leg of an L-shaped bracket 36. The bracket 32 is fixedly mounted on the device 10 structure. The knob 28 is connected to a drive shaft 38, one end of which is received in an opening provided in the bracket 36. A gear 40 is fixedly mounted intermediate the ends of the shafts 38. The gear 40 meshes with a second, smaller gear 42 which is positioned at right angles with respect thereto. A torsion spring 44 is received on the shaft 38 between the gear 40 and the bracket 36. One end 46 of the spring is attached to the bracket 36 while the other end 48 is attached to the gear 40. Thus, upon turning of the drive shaft 38 to reset the odometer, the spring 44 will wind up. When the knob 28 is released, the spring 44 will urge the shaft 38 to its original position.

The gear 42 is fixedly mounted on the odometer reset shaft 26. This shaft extends from the odometer drum structure and terminates in an opening 50 provided in bracket 36. The gear 42, as previously mentioned, is smaller than the gear 40. The diameter of the gear 40 is about twice the diameter of gear 42 whereby it is only necessary to rotate the drive shaft 38 about one-half the angular distance of the required angular travel of the odometer reset shaft 26 for resetting of the odometer. This has been found to be an optimum ratio for desired feel and effort of manually turning knob 28.

A ring 52 is fixedly mounted on reset shaft 26 adjacent the gear 42, being positioned between the gear 42 and the odometer drums. The ring 52 has a tooth 54 which extends axially outwardly from the ring towards the odometer drums. The tooth 54 is at substantially right angles to the plane of the ring 52.

Figure 5:
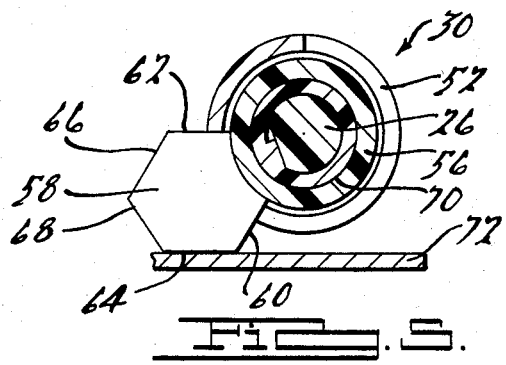
FIG. 5 is a view similar to FIG. 4 illustrating structure of the odometer reset mechanism after the odometer has been reset.

A second ring 56 is mounted on the reset shaft 26 adjacent to the ring 52, the ring 56 being positioned between the ring 52 and the odometer drums. The ring 56 is freely rotatable on the shaft 38. A stop arm 58 extends radially outwardly from the periphery of the ring 56. As will be noted in FIG. 5, the stop arm 58 has outwardly directed edge portions 60, 62 which extend from the ring 56 and merge into inwardly directed end edge portions 64, 66 and terminates in straight edge portion 68. The tooth 54 extends into the plane generated by the stop arm 58 upon rotation of the ring 56 whereby the tooth 54 will engage the stop arm 58 upon rotation of the ring 52.

A stop plate 72 is provided beneath the stop arm 58. The stop plate 72 is integral with the bracket 32. The function of the stop plate 72 is to provide a stop surface to limit the angular motion of the stop arm 58.

Figure 4:
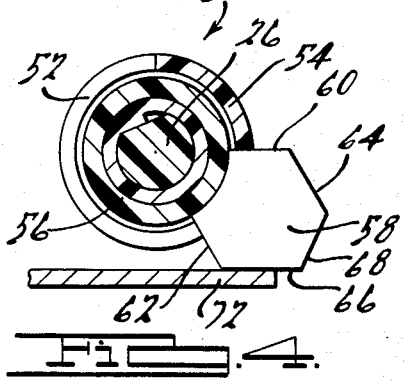
FIG. 4 is a sectional view taken substantially along the line 4—4 of FIG. 3 looking in the direction of the arrows.

Operation of the odometer reset mechanism 30 may now be understood. When it is desired to reset the odometer, the knob 28 is turned clockwise as viewed in FIG. 3 from its initial start position shown in FIGS. 3 and 4. This initial start position is determined by the edge 66 of the stop arm 58 being in abutment with the stop surface defined by the plate 72. The tooth 54 is in abutment with the opposite edge 60. The action of the torsion spring 44 urges the mechanism to this position. Twisting of the knob 28 in the clockwise direction will, through the action of the gears 40, 42, cause the odometer reset shaft 26 to rotate counterclockwise as viewed in FIG. 4. The tooth 54 will move away from the stop arm 58. The stop arm will stay in the position shown, it being remembered that the ring 56 is freely rotatable on shaft 26. After the tooth 54 travels around on the other side of the stop arm 58 it will engage edge 62 of the stop arm and move the stop arm and thus ring 56. When the stop arm 58 reaches the position shown in FIG. 5, the edge 64 will contact the surface of stop plate 72 and prevent further movement. At this time, the odometer will have been set to the zero reading. Upon release of the knob 28, the reset mechanism will return to the position shown in FIG. 4 as a result of the action of the torsion spring 44.

It will be noted that in the above-described action, the reset shaft 26 will travel through more than 360° in either the clockwise or counterclockwise direction. The tooth 54 first rotates through an arc of 360° less the angle defined by the width of the stop arm 58 before the tooth 54 contacts the stop arm 58. After contact, the tooth 54 travels through an arc of less than 360°, this being the angular distance between the stop arm 58 position shown in FIG. 4 and the stop arm 58 position shown in FIG. 5. This additional distance is, in the example shown, somewhat more than 90°. The reason for this more than 360° travel is that conventional odometer resetting requires more than a full turn in order to reset the odometer to the zero position.

Having thus described my invention, I claim:

1. An odometer reset mechanism adapted to turn an odometer reset shaft through an angular distance greater than 360° comprising a manually turnable drive shaft drivingly connected to an odometer reset shaft, a first ring fixedly mounted on the odometer reset shaft to turn therewith, a second ring mounted on the odometer reset shaft adjacent to the first ring, said second ring being freely rotatable on the odometer reset shaft, a stop arm extending radially outwardly from said second ring, a tooth extending axially outwardly from said first ring into the plane generated by the stop arm upon rotation of the second ring whereby the tooth will engage the stop arm upon rotation of the first ring, a member having a stop surface positioned in abutting relationship to said stop arm, said stop arm abutting said stop surface upon rotation of the second ring through an arc of less than 360° in either the clockwise or counterclockwise direction, one of said abutting positions defining a start position and the other of said abutting positions defining a reset position, said tooth being rotatable in either the clockwise or counterclockwise direction through an arc of 360° less the angle defined by the width of the stop arm before contacting the stop arm, whereby upon rotation of said drive shaft, the odometer reset shaft may be rotated a distance equal to the arc of rotation of the tooth prior to its contacting the stop arm plus the arc of rotation of the stop arm prior to its contacting the stop surface, the sum of said two arcs being greater than 360°.

2. An odometer reset mechanism as defined in claim 1, further characterized in the provision of spring means operably connected to said drive shaft constantly urging said drive shaft to rotate in a direction opposite to the direction of rotation necessary to cause resetting of an odometer whereby the stop arm is urged to a position into abutment with the stop surface to define a start position for the odometer reset mechanism.

3. An odometer reset mechanism as defined in claim 1, further characterized in that the driving connection between the drive shaft and the odometer reset shaft comprises a first gear mounted on the drive shaft and a second gear mounted on the odometer reset shaft, said two gears meshing in driving relationship, the diameter of said first gear being about twice the diameter of the second gear whereby it is only necessary to rotate the drive shaft about one-half the angular distance of the required angular travel of the odometer reset shaft for resetting the odometer.

* * * * *